No. 679,875. Patented Aug. 6, 1901.
H. W. BLAISDELL.
CONVEYER.
(Application filed Aug. 4, 1900.)
(No Model.) 4 Sheets—Sheet 1.
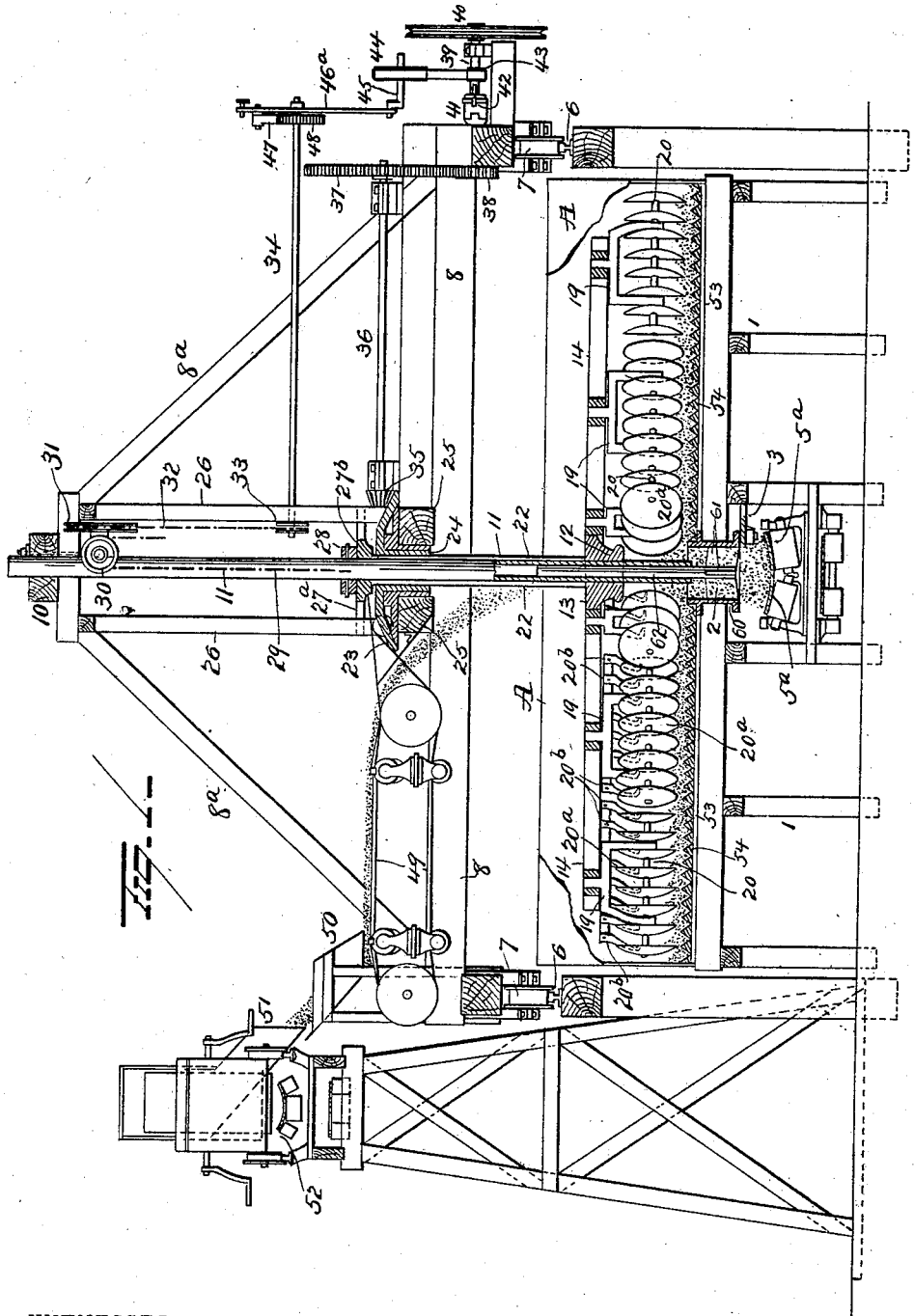
WITNESSES
E. S. Nottingham
G. F. Downing
INVENTOR
H. W. Blaisdell
By H. A. Seymour
Attorney No. 679,875. Patented Aug. 6, 1901.
H. W. BLAISDELL.
CONVEYER.
(Application filed Aug. 4, 1900.)
(No Model.) 4 Sheets—Sheet 2.
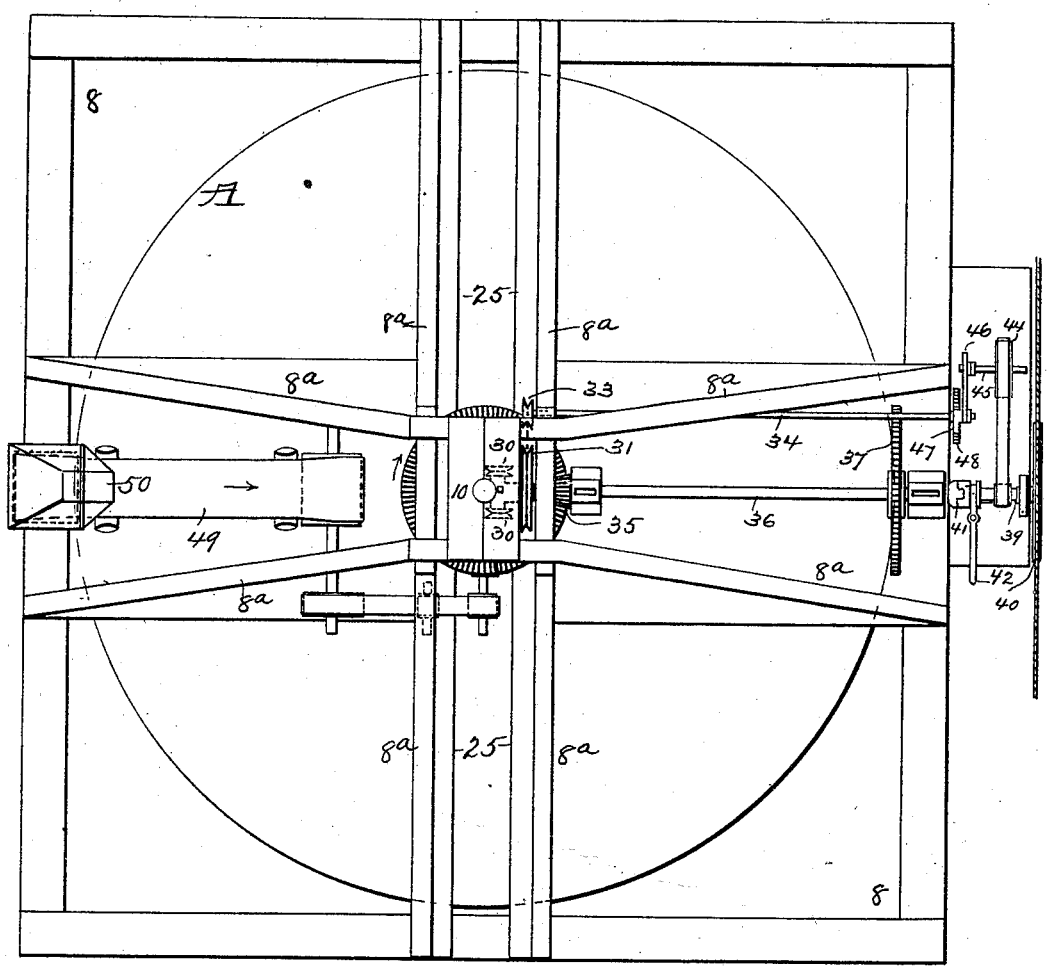
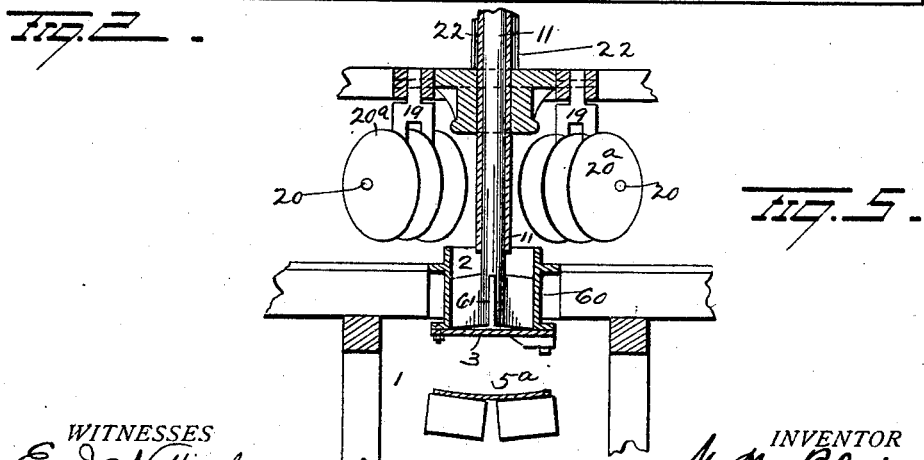
WITNESSES
E. J. Nottingham
G. F. Downing
INVENTOR
H. W. Blaisdell
By H. A. Seymour
Attorney No. 679,875. Patented Aug. 6, 1901.
H. W. BLAISDELL.
CONVEYER.
(Application filed Aug. 4, 1900.)
(No Model.) 4 Sheets—Sheet 3.
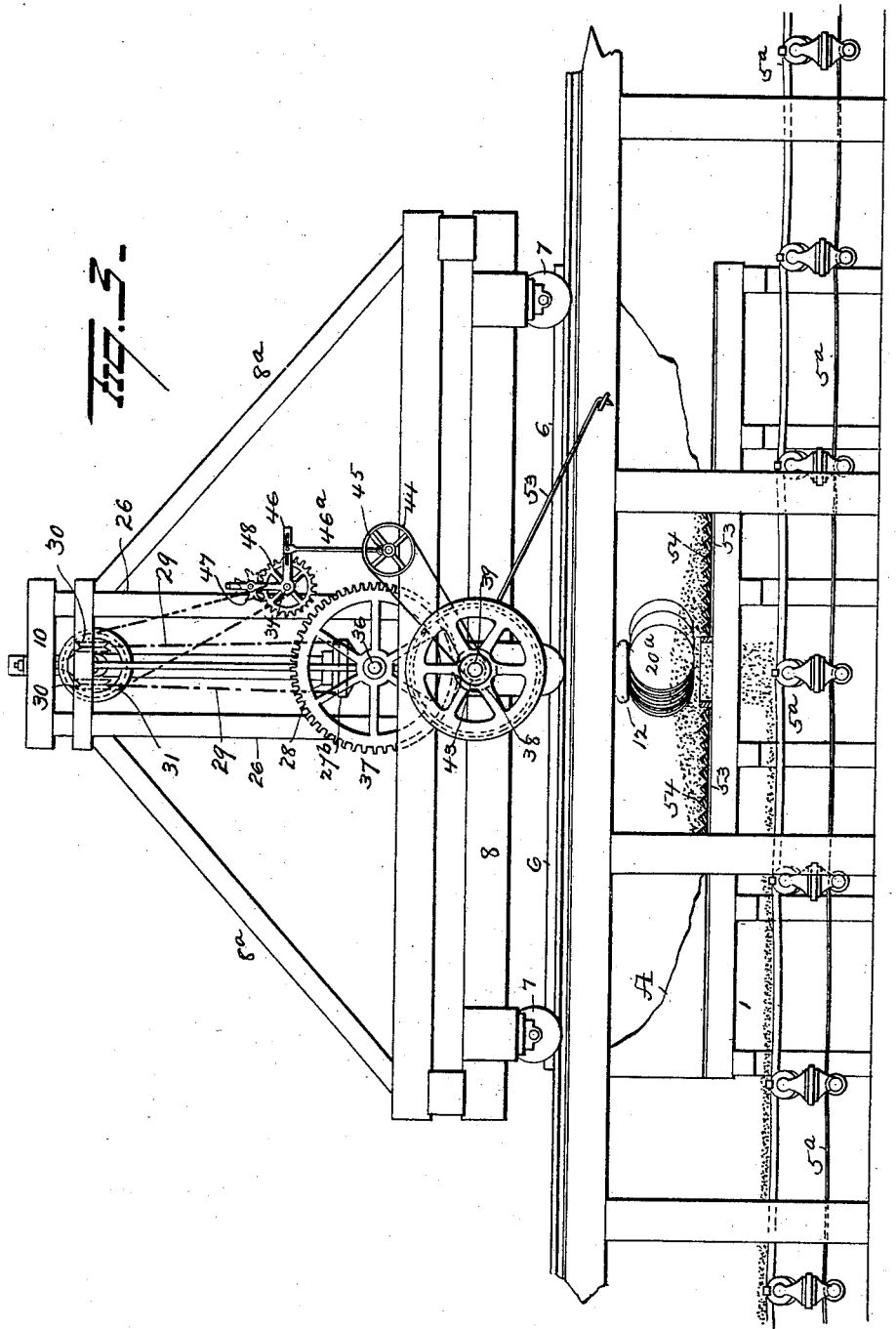
WITNESSES
INVENTOR
H. W. Blaisdell
By H. A. Seymour
Attorney No. 679,875. Patented Aug. 6, 1901.
H. W. BLAISDELL.
CONVEYER.
(Application filed Aug. 4, 1900.)
(No Model.) 4 Sheets—Sheet 4.
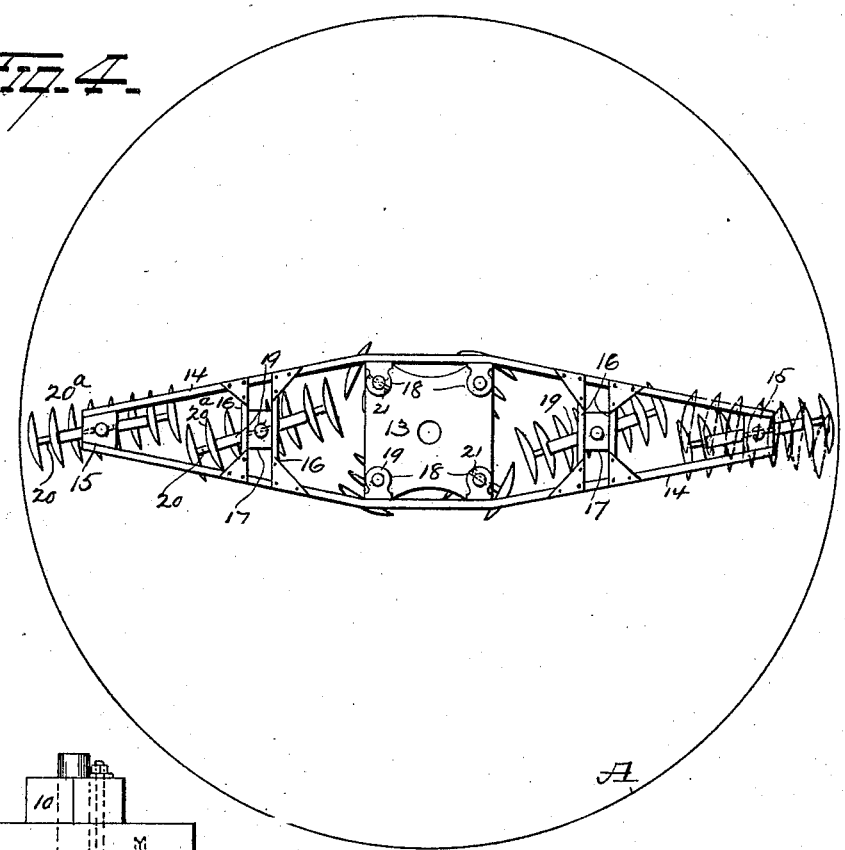
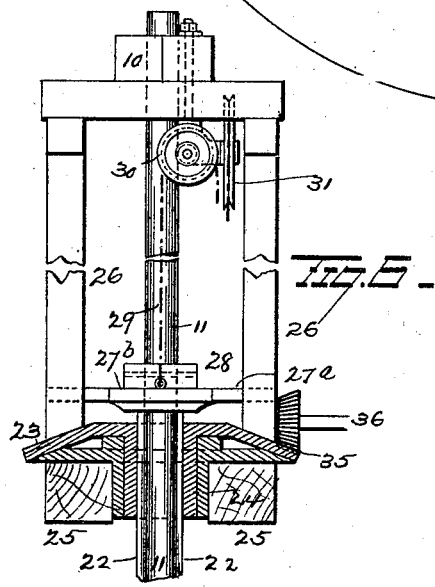
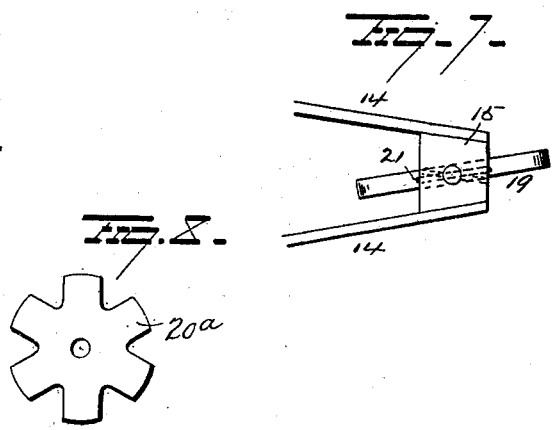
WITNESSES
INVENTOR
H. W. Blaisdell
By H. A. Seymour
Attorney

UNITED STATES PATENT OFFICE.

HIRAM W. BLAISDELL, OF YUMA, ARIZONA TERRITORY.

CONVEYER.

SPECIFICATION forming part of Letters Patent No. 679,875, dated August 6, 1901.

Application filed August 4, 1900. Serial No. 25,932. (No model.)

*To all whom it may concern:*

Be it known that I, HIRAM W. BLAISDELL, a resident of Yuma, in the county of Yuma and Territory of Arizona, have invented certain new and useful Improvements in Conveyers; and I do hereby declare the following to be a full, clear, and exact description of the invention, such as will enable others skilled in the art to which it appertains to make and use the same.

My invention relates to an improvement in apparatus for filling and emptying circular bins, vats, or other receptacles, the object of the invention being to provide an apparatus of the above-mentioned character which will distribute the material supplied to a bin or vat evenly throughout the entire area thereof and which can be operated to gradually feed the contents of the bin or vat to a central discharge-port and quickly empty the same.

A further object is to provide a bin or other receptacle with an improved distributer and discharger which can be adjusted to distribute material in the bin or vat evenly over the entire area thereof, and also adjusted to operate as a discharging device for directing the material toward a discharge-opening.

With these objects in view the invention consists in certain novel features of construction and combinations and arrangements of parts, as will be more fully hereinafter described, and pointed out in the claims.

In the accompanying drawings, Figure 1 is a side view partly broken away and partly in section. Fig. 2 is a plan view. Fig. 3 is a side view taken at right angles to Fig. 1. Fig. 4 is a plan view with the supporting-frame and operating mechanism removed, and Figs. 5, 6, 7, and 8 are views of details of construction.

A represents a bin, vat, or other receptacle elevated on trestle-work 1 and provided in its bottom with a discharge-port 2, normally closed by a hinged door or gate 3, and a conveyer, preferably an endless conveyer 5ª, is mounted beneath the discharge-port 2, so as to receive the material from the bin and carry it away as fast as fed to the conveyer.

On opposite sides of the bin or vat, or rather on opposite sides of the series of bins or vats, are located the rails 6, on which are mounted wheels 7, carrying the horizontally-disposed frame 8, which latter is designed to travel lengthwise the track and over the series of bins and vats. This frame carries the upwardly-inclined braces 8ª, which carry at their upper inner ends a bearing 10 for sustaining the upper end of shaft 11 against lateral movement and which together with transverse timbers 25 of frame 8 support and brace the vertical posts 26, which latter form a guideway for mechanism of the distributing and discharging or excavating mechanism, as will be hereinafter more fully described. Secured to the cross-timbers 25 of the frame 8 between and at the bases of the posts 26 is the bracket or bearing 24, having a central opening for the passage of the hollow shaft 11. To the lower end of shaft 11 is secured a collar 12 integral with a plate 13, (see Fig. 4,) and horizontal rods 14 are connected between their ends to opposite sides of the plate 13 and are bent toward each other at their ends and secured to plates 15. The rods 14 are connected between the plate 13 and their respective ends by rods 16, which support plates 17. The plates 15 and 17 and the four corners of plate 13 are made with bearing-sleeves 18 for vertical forks 19, which support shafts 20, each carrying a gang of parallel concavo-convex disks 20ª and each provided with a scraper 20ᵇ.

The forks 19 are secured in their bearings by locking-pins 21, and the bearings are made with two seats for the pins to lock the forks in the positions shown by full and dotted lines in Fig. 7.

The shaft 11 is made with a series of feathers 22, mounted in corresponding grooves in the hub of beveled gear 23, which latter is supported in bearing 24, carried by the transverse timbers 25 of the frame 8. Posts 26 connect the timbers 25 and bearing 10 and form guides or supports for the arms 27ª integral with the block 27ᵇ. This block is loosely mounted on the shaft 11, so that the latter may be rotated therein, and the arms 27ª of said block embrace the opposite sides of one or more posts 26 and prevent the block from rotating with the shaft. Chains 29 are secured to this block 27ᵇ and pass upwardly over the pulleys 30 of the worm-wheel tackle of the ordinary construction, as shown, while the weight of the shaft and its attached distributing and discharging mechanism is borne by the collar 28, secured to the shaft 11.

Chains 29 are passed over chain-pulleys 30, which latter are operated by a pulley 31 in the usual manner. The pulley 31 is connected by chain 32 with small pulley 33 on shaft 34. The bevel-gear 23 on shaft 11 receives motion from a bevel-gear 35 on a shaft 36, provided with a large gear 37, meshing with a small gear 38 on drive-shaft 39, which latter is operated by a drive-pulley 40, connected with and operated by a running rope or by any approved engine. (Not shown.) The drive-shaft 39 is provided with a clutch 41, operated by a lever 42 to throw the small gear 38 into and out of operation. A small pulley 43 is secured on shaft 39 and is connected with a larger pulley 44 on a crank-shaft 45, the crank-arm of which is connected by pitman 46$^a$ with the arm 46, loosely fulcrumed on shaft 34. This arm 46 is provided at its outer or free end with an elongated slot for the adjustable attachment thereto of the upper end of the pitman 46$^a$, and it carries at a point adjacent to the periphery of the wheel 48 a double-ended pawl 47, which latter is designed to engage ratchet-teeth formed on the outer face of wheel 48. Thus it will be seen that by throwing one end of the pawl into engagement with the ratchet the wheel 48 will be rotated in one direction, and by throwing in the other end of pawl the direction of rotation of wheel 48 will be reversed, thus providing for both elevating and lowering the shaft carrying the distributing and discharging mechanism, and by disengaging both ends, so as to disconnect the arms from the wheel, the wheel 48 will remain idle, and by providing arm 46 with an elongated slot for the adjustment of the pitman 46$^a$ it will be seen that the speed in elevating and lowering the distributing and discharging mechanism may be nicely regulated.

A belt conveyer 49 is mounted on the frame 8, so as to discharge, preferably, into the center of the bin or vat A and receives material from a hopper 50, which in turn receives the material from a tripper 51 on a conveyer 52, disposed beside the bin. This particular arrangement and construction of conveyers for supplying material to the bin is immaterial, and I may employ any approved mechanism which will supply material to the center of the bin.

The frame 8 is locked to the rail-support by a hook 53 to hold the same in position over the bin.

If desired, the disks may be notched in their periphery, as shown in Fig. 8, or I may employ any other well-known form of disk without departing from my invention.

The operation of my improvements is as follows: When the bin or vat is empty and it is desired to fill the same, the disk conveyers are in the position shown in dotted lines in Fig. 4. The grain, ore, clay, sand, gravel, tailings, or other material is fed to the bin and the lever 42 operated to throw the clutch 41, thus locking the shaft 39 to the driving mechanism and transmitting motion through gears 38, 37, and 35 to gear 23, and from thence to shaft 11, carrying the disks, which latter will be carried around and around the bin, and owing to the peculiar angle of the disks they will carry the material toward the wall of the bin, thus evenly distributing the same throughout. The drive-shaft 39 also revolves pulleys 43 and 44 to turn crank-shaft 45 and oscillate lever 46, the pawl 47 thereon having been operated to turn the ratchet-wheel 48 in one direction and through the medium of pulleys 31 and 30 and chains 29 slowly raise the shaft 11 and distributing and discharging disks carried thereby, so that as the depth of material in the bin increases the disks will be raised to accommodate. When the material is to be emptied from the bin, the disks are turned about one hundred and sixty degrees and locked in such position by the pins 21, as shown in full lines in Fig. 4. The gate 3 is then opened and part of the material will fall through discharge-port 2 onto conveyer 5$^a$. The discharging-disks will in the meantime be operated through the mechanism above described, and owing to the changed position of the disks will carry the material to the center of the bin, or, in other words, to the discharge-port, the pawl 47 having been operated to drive the ratchet-wheel 48 in the opposite direction to gradually lower the disk conveyer to remove all of the material in the bin. If in filling or emptying the bin the disk conveyers are being raised or lowered too rapidly, the stroke of pawl 47 can be shortened or lengthened by changing the point of connection of link 46$^b$ with member 46$^a$ of lever 46 or thrown out of engagement with ratchet-wheel altogether until the material has been properly distributed, when the pawl can be again thrown into operation and the disks raised or lowered. Each disk when in operation is revolved independently by engagement with the material in the bin and the scrapers 20$^b$ will keep the disks from clogging during their operation.

When it is desired to move the frame 8 and mechanism carried thereby to another bin, the hook 53 is disengaged from the rail-support and the disk conveyer raised to its highest position, when the apparatus can be readily moved along the track and placed in position to operate in another bin.

While I have described my improvement as adapted for evenly filling and emptying bins containing sand, gravel, clay, grain, and other like materials, I would have it understood that my apparatus is also particularly adapted for handling copper-ores in the leaching process and tailing being treated by the cyanid process, and when used in the latter the bin would be more properly a vat and would be provided, as shown in the drawings, with a filter-bottom, as shown in Fig. 1. This bottom comprises slats 53, with triangular slats 54 resting on slats 53 and at right angles thereto, the spaces between the triangular slats being filled with sand and gravel, through which the filtered water percolates.

In order to maintain the lower end of the shaft 11 in its proper position and prevent any lateral movement of same, I prefer to provide the metal frame 60, forming the wall of the discharge-port, with webs or ribs 61, carrying the upright stud 62, which latter rests within the lower open end of the shaft 11 and holds same against lateral displacement.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In apparatus for filling and emptying a bin having a central discharge-opening, a rotary distributing and discharging apparatus, and means whereby said apparatus is adjustable in two directions, to move material in the bin either toward the central discharge-opening or away from the same.

2. The combination with a bin or receptacle having a discharge-port in its center and a traveling conveyer beneath said discharge-port, of a series of rotary discharging-disks in said bin and means for revolving said series of rotary disks around the central discharge-port to move the material in the bin to said discharge-port.

3. The combination with a bin or receptacle having a discharge-port, of a revoluble discharging apparatus in said bin or receptacle, adapted to force the material to the discharge-port, means for revolving said apparatus in a horizontal plane and means for bodily raising and lowering said discharging apparatus.

4. The combination with a bin having a central discharge-opening, of a distributing and discharging apparatus mounted to revolve in the bin around said central discharge-opening, means for revolving said apparatus to draw the material therein toward or away from the discharge-port, and means for gradually raising or lowering said apparatus in the bin.

5. The combination with a bin having a discharge-port, of distributing and discharging apparatus mounted to rotate in the bin to force the material toward or away from the discharge-port, driving mechanism for rotating said apparatus and means connected with said driving mechanism for automatically raising or lowering the distributing and discharging apparatus while rotating in the bin.

6. The combination with a circular bin having a discharge-port, of a distributing and discharging apparatus mounted to rotate in said bin and comprising a series of gangs of disks and means for locking said gangs of disks in position to force the material in the bin toward or away from the discharge-port.

7. The combination with rails to be disposed at respective sides of a series of bins, of an elevated frame having wheels mounted on said rails, a distributing and discharging apparatus carried by said frame and adapted to force material in a bin toward or away from the discharge-port therein, means for rotating said apparatus and automatic means for raising and lowering same simultaneously with the rotation thereof.

8. The combination with a bin or receptacle having a discharge-port, an endless conveyer below the same, a gate adapted to close said discharge-port and a conveyer adapted to discharge material into the bin, of a distributing and discharging or excavating apparatus mounted to rotate in the bin and adapted to force the material toward or away from the discharge-port.

9. The combination with a bin having a discharge-port, a conveyer below the same, a gate adapted to close said discharge-port, and a conveyer disposed beside the bin, of a frame mounted above the bin, a conveyer carried by the frame adapted to receive material from the conveyer beside the bin and discharge it into the bin, and a rotary distributing and discharging apparatus carried by the frame and adapted to force the material in the bin toward or away from the discharge-port.

10. A rotary distributing and discharging apparatus for bins or receptacles, comprising bars spaced apart and supporting bearings between them, forks mounted in said bearings, keys adapted to lock the forks in different positions in the bearings, and a gang of disks supported by each fork.

11. In an apparatus for filling and emptying bins, the combination with a conveyer and a discharging device for deflecting the material on said conveyer, of a traveling frame adapted to move lengthwise said conveyer and carrying an endless conveyer adapted to receive material deflected from said first-mentioned conveyer and a rotary distributing and discharging apparatus also carried by said movable frame and adapted to operate within a bin.

12. The combination with a bin having a false or filter bottom and a discharge-port in the latter, a conveyer below said port, and a conveyer alongside of said bin, of a frame above the bin, a conveyer carried by said frame and adapted to receive material from the conveyer alongside of the bin and discharge it into the bin, and a rotary distributing and discharging apparatus carried by the frame and adapted to force the material in the bin toward or away from the discharge-port.

13. A horizontal revoluble distributing and discharging apparatus comprising a traveling frame adapted to move over a series of bins or vats, a rotary distributing or discharging apparatus carried by said frame, means for revolving said apparatus and means also carried by said frame for elevating and lowering said apparatus bodily into or out of a bin.

In testimony whereof I have signed this specification in the presence of two subscribing witnesses.

HIRAM W. BLAISDELL.

Witnesses:
S. A. I. ERGUSSON,
GEO. CHAFFEY.